Aug. 17, 1926.                                              1,596,090
Y. FLORELL
COMBINED FRICTIONAL AND ANTIFRICTIONAL BEARING
Filed March 3, 1921
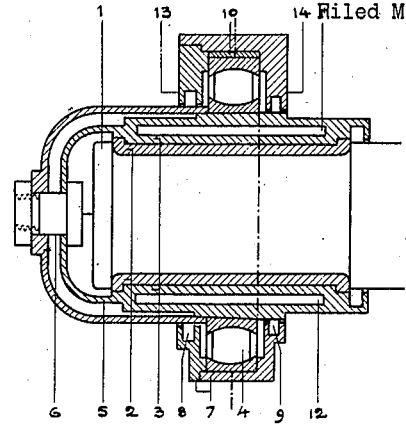
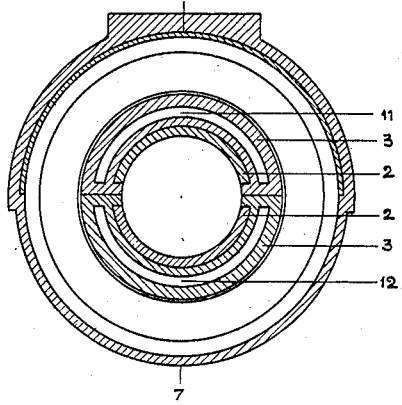
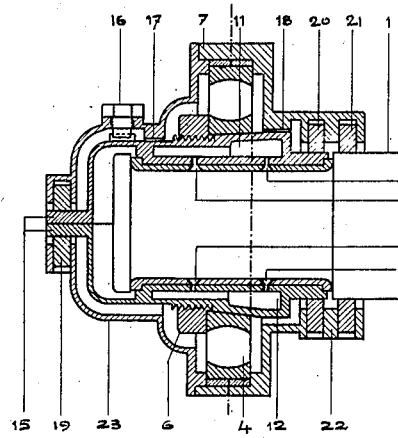
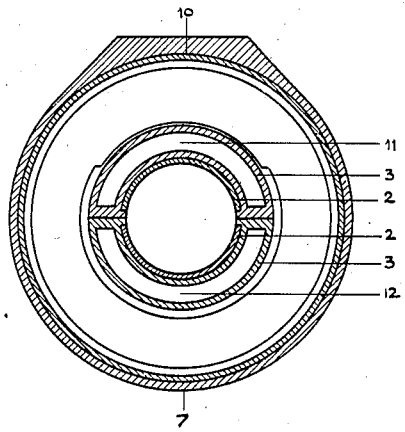
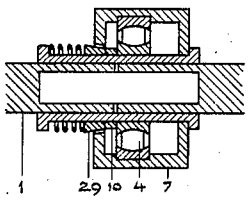
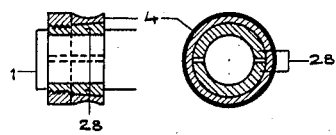
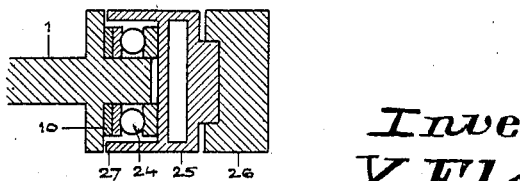
Inventor
Y. Florell,
By Marks & Clerk
Attys.

Patented Aug. 17, 1926.

1,596,090

UNITED STATES PATENT OFFICE.

YNGVE FLORELL, OF STOCKHOLM, SWEDEN.

COMBINED FRICTIONAL AND ANTIFRICTIONAL BEARING.

Application filed March 3, 1921, Serial No. 449,383, and in Sweden March 8, 1919.

The present invention relates substantially to a combined frictional and antifrictional bearing, which is so arranged that the frictional bearing will be active, if the antifrictional bearing is put out of order.

The drawing shows five embodiments of the invention in longitudinal section in Figs. 1, 3, 5, 6 and 7 respectively. The embodiments according to Figs. 1, 3 and 7, which are adapted for a wagon box, are shown in cross section in Figs. 2, 4 and 8.

According to Figs. 1 and 2 the shaft 1 is surrounded by the friction bearing which in turn carries and is surrounded by the antifrictional bearing 4. The friction bearing consists of two sleeves 2 and 3, the inner sleeve 2 consisting of babbitt which is cast in the sleeve 3. The friction bearing has a conical surface, on which the inner race ring is kept by the sleeve 5 and screw with nut 6. The conical surface can be substituted by a shoulder. In order to facilitate the mounting of the shaft, the friction bearing is divided axially, the two parts being kept together by the clamping device 5, 6. Between the box or casing 7 and the friction bearing packings 8 and 9 are arranged. In a suitable place or places, for instance between the casing and the outer race ring there is inserted a layer 10 of a fusible material such as ebonite or rubber.

The lateral parts 13, 14 surrounding the friction bearing are not normally in engagement with the latter, but lie at a certain distance therefrom, which distance is preferably very small, and under all circumstances must be smaller than the thickness of the layer 10 and smaller than the greatest diameter of the roller. The packings 8, 9, however, may abut against the friction bearing so as to protect the roller bearing from dust.

If now the roller bearing runs hot, so that the layer 10 melts, or if the roller bearing or any part resting thereon or supporting it, is deformed, the casing will descend so as to rest with its lateral parts against the frictional bearing, thereby preventing this latter from rotating, the opposing surfaces of parts 13, 14 and frictional bearing forming locking and supporting surfaces, which under the influence of the load lock the box and friction bearing together. Thus the friction bearing will act while the roller bearing is set out of operation.

It is obvious the device can also be arranged in such a manner that the casing may be locked against the inner race ring, or that the outer race ring may be locked against the friction bearing or the inner race ring.

According to the embodiment shown in Figs. 3 and 4 the box is provided with axial extensions 22, 23, so that it encloses the whole friction bearing. These extensions are provided with projections 17 and 18, preferably rifled, which stop the friction bearing, when the box descends. The projection 22 is provided with two packings 20 and 21 tightening against the friction bearing and the shaft respectively, and a packing is provided between the extension 23 and a central visible end projection 15 on the friction bearing, which projection shows if the friction bearing rotates or not.

In this embodiment there is a screw 16, which can be operated manually so as to engage between two stops on the friction bearing, thereby setting this latter into function and bringing the roller bearing out of operation.

The screw can be substituted by a wedge or any other suitable device.

The inner race ring is here clamped to the conical surface of the friction bearing through a nut 6, screwed directly on the sleeve 3.

In both embodiments described the sleeve 3 is provided with inner chambers 11, 12, for instance two, which serve as storing chambers for a lubricating matter and which through channels such as 30, 31, 32 and 33, Fig. 3, or the like communicate with the friction surface. The channels ought to be closed normally by any fusible material, such as paraffin, so that, when the friction bearing begins to act and thus is heated by the friction the paraffin melts and allows the flow of oil to the friction surface.

Preferably the chambers 11, 12 are of about the same length as the friction bearing, but if a reduced diameter of the bearing is desired, the chambers may not extend in that part of sleeve 3, which lies opposite the roller bearing.

Said lubricating device can also be applied to other bearing constructions, where a friction bearing and an antifrictional bearing rest the one upon the other.

The lubricating chambers may also be provided in the shaft as in Fig. 6, the box or any other part of the construction.

In Fig. 5 the invention is applied to an end bearing. The shaft abuts through the ebonite ring 10 against the ball bearing 24 which in turn through the friction bearing 25 abuts against the frame 26. If the ebonite melts or the ball bearing is deformed, the shaft 1 moves into engagement with the friction bearing part 27 setting this bearing into function.

In Fig. 6 the ebonite is placed laterally of the inner race ring and inside a spring actuated sleeve 29 which, when the ebonite melts, enters between the box and the friction bearing and lock them together.

Even in constructions, where the antifrictional bearing is put on a sleeve 28 attached to the shaft, said sleeve can be axially divided, and the described clamping device can be used, as shown in Figs. 7 and 8.

What I claim as new and desire to secure by Letters Patent of the United States is:—

1. A combined antifriction and friction bearing, comprising a shaft, a friction bearing sleeve mounted on said shaft, a casing, the rolling bodies of the antifriction bearing being inserted between two race rings, surrounding each other and mounted between opposite peripheral surfaces on the friction bearing sleeve and the casing, locking surfaces on the casing normally located at a small distance from opposite locking surfaces on the sleeve, and means whereby upon a small movement of the casing and sleeve towards each other, said parts will be locked together, and the shaft and the sleeve rotate relatively to each other.

2. A bearing for a shaft, comprising a bearing sleeve surrounding the shaft, divided axially into two parts and arranged between two shoulders on the shaft, a lining of bearing material on the inside of said sleeve, said material being of a softer material than the bearing sleeve, a casing, an anti-friction bearing between said casing and sleeve having a race-ring and a nut for holding said ring on the outside of the sleeve and for holding the parts of the sleeve together, the parts between the rolling bodies of the antifriction bearing and the shaft consisting partly of the said sleeve, partly of said race ring and partly of said lining of bearing material.

3. A combined antifriction and friction bearing, comprising a rotating shaft, a stationary casing, rolling bodies between said rotating shaft and stationary casing, a friction bearing between the rolling bodies and the rotating shaft, the member between the rolling bodies and the rotating shaft consisting of a main bearing sleeve, a race ring pushed upon said sleeve from the end thereof, and a lining of any bearing material, on the inside of said main sleeve, said lining being of a softer material than the bearing sleeve.

4. A combined antifriction and friction bearing, comprising a shaft, a friction bearing sleeve mounted on said shaft, a casing surrounding said sleeve, rolling bodies between said casing and sleeve, a race ring between the rolling bodies and the sleeve, a race ring between the rolling bodies and the casing, locking surfaces on the casing normally located at a small distance from opposite locking surfaces on the sleeve, so that upon a small movement of the casing and sleeve towards each other, said parts will be locked together, whereby the antifriction bearing will be put out of action, while the friction bearing comes into action, such locking surfaces being located at each side of the race rings.

5. A combined antifriction and friction bearing comprising a shaft, a friction bearing sleeve on the shaft, a casing surrounding said sleeve, rolling bodies between the casing and said sleeve, a part of the sleeve having a surface, which is tightened against the casing, a and a surface, which is visible from the outside.

6. A combined antifriction and friction bearing comprising a rotating shaft, a friction bearing sleeve on the shaft, a non-rotating casing surrounding said sleeve, rolling bodies between the non-rotating casing and said sleeve, a part of the sleeve having a surface, which is tightened against the casing, and a surface, which is visible from the outside.

7. A combined antifriction and friction bearing comprising a rotating shaft, a friction bearing sleeve on the shaft, a non-rotating casing surrounding the sleeve, rolling bodies between the non-rotating casing and said sleeve, an inner race ring mounted on the sleeve, the latter having parts which are tightened against the casing on each side of the said race ring.

8. A combined antifriction and friction bearing, comprising a shaft, rolling bodies between two bearing members, which latter are arranged the one upon the other on said shaft, the inner one of said bearing members consisting of a friction bearing sleeve, a lubricant chamber, packings arranged in such a way, that at the same time as the chamber for the rolling bodies is closed from the lubricant chamber a part of the friction bearing sleeve is visible from the outside.

9. A combined antifriction and friction bearing comprising a rotating shaft, rolling bodies between two bearing members which latter are arranged the one upon the other on said shaft, the outer one of said bearing members consisting of a non-rotating casing and the inner one of said bearing members consisting of a friction bearing sleeve, normally rotating with the shaft, said sleeve having a part, which projects visibly through a packing, and means for locking together the outer one of said bearing members when the friction bearing comes out of action.

10. A combined antifriction and friction bearing comprising a shaft, rolling bodies between two bearing members which latter are arranged the one upon the other on said shaft, and means which can be adjusted by hand, so that the said two bodies are locked together.

11. A combined antifriction and friction bearing comprising a shaft, rolling bodies between two bearing members which latter are arranged the one upon the other on said shaft, an adjustable screw, which is arranged on the one body and which, in a certain position, engages projections on the other body, whereby the bodies are locked together.

12. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together, upon such changing of said material, the two parts, which are located at opposite sides of the rolling bodies.

13. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together, upon such changing of said material, the two parts, which are located at opposite sides of the rolling bodies, said material consisting of a solid relatively easily fusible material.

14. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together, upon such changing of said material, the two parts, which are located at opposite sides of the rolling bodies, said material abutting against a race ring of the antifrictional bearing.

15. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together, upon such changing of said material, the two parts, which are located at opposite sides of the rolling bodies, said material consisting of a layer of ebonite.

16. A bearing consisting of a friction bearing for the shaft, an antifriction bearing for the same shaft, said two kinds of bearings being mounted the one upon the other, a part of the bearing being provided with a chamber for lubricating material which communicates with the friction surface, but is closed from communication with the space around the rolling bodies of the antifriction bearing, a casing for the bearing, and means for preventing the lubricating material to pass from the friction surfaces to the outside of the casing.

17. A combined antifriction and friction bearing comprising a rotating shaft, rolling bodies between a non-rotating casing for the antifrictional bearing, a friction bearing sleeve on the shaft, said sleeve being surrounded by the casing and having a part, which is tightened against the casing and has a surface, which is visible, an inner race ring on the friction bearing sleeve, and an outer race ring between the rolling bodies and the casing.

18. A combined antifriction and friction bearing comprising a shaft, rolling bodies between two bearing members which latter are arranged the one upon the other on said shaft, the inner one of said bearing members consisting of a friction bearing sleeve, a part of said sleeve covering the end surface of the shaft, and part of the end surface of the sleeve being visible.

19. A combined antifriction and friction bearing comprising a shaft, rolling bodies between two bearing members which latter are arranged the one upon the other on said shaft, the inner one of said bearing members consisting of a friction bearing sleeve and a race ring mounted thereon, the outer one of said bearing members consisting of a casing and an outer race ring at the inside thereof, packings between said casing and the bearing sleeve, which latter has a surface which is visible.

20. A combined antifriction and friction bearing comprising a shaft, rolling bodies between two bearing members which latter are arranged the one upon the other on said shaft, the inner one of said bearing members consisting of a friction bearing sleeve, a part of said sleeve covering the end surface of the shaft, said part of the sleeve having a central projection which projects through a casing for the bearing.

21. A combined antifriction and friction bearing comprising a shaft, rolling bodies between two bearing members which latter are arranged the one upon the other on said shaft, the inner one of said bearing members consisting of a friction bearing sleeve, a part of said sleeve covering the end surface of the shaft, said part of the sleeve having a central projection, and a packing between said projection and the casing of the bearing.

22. A combined antifriction and friction bearing, comprising a shaft, a friction bearing sleeve mounted on said shaft, a casing surrounding said sleeve, rolling bodies between said casing and sleeve, a race ring between the rolling bodies and the sleeve, a race ring between the rolling bodies and the casing, locking surfaces on the casing normally located at a small distance from opposite locking surfaces on the sleeve, so that upon a small movement of the casing and sleeve towards each other, said parts will be locked together, whereby the antifriction bearing will be put out of action, while the friction bearing comes into action, and adjustable means whereby said casing and said sleeve can be locked together without being moved towards each other.

23. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together, upon such changing of said material, the two parts, which are located at opposite sides of the rolling bodies, the friction bearing being provided with one or more chambers for a lubricating material, which communicate with the friction surface.

24. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together upon such changing of said material, the two parts, which are located at opposite sides of the rolling bodies, the friction bearing being provided with one or more chambers for a lubricating material, which communicate with the friction surface, the sleeve being divided axially.

25. A bearing consisting of a friction bearing for the shaft, an antifriction bearing for the same shaft, said two kinds of bearings being mounted the one upon the other, a material which is arranged close to any of the parts of the bearing and which, when the bearing runs hot, changes in form, and means for locking together, upon such changing of said material, the two parts, which are located at opposite sides of the rolling bodies, the friction bearing being provided with one or more chambers for a lubricating material, which communicate with the friction surface, the sleeve being divided axially and the said race ring being kept on the sleeve by a nut, which also holds the parts of the sleeve together.

26. A combined friction and antifriction bearing comprising a friction bearing sleeve, frictionally surrounding the shaft, a casing, rolling bodies between said sleeve and casing, an inner race ring between the sleeve and the rolling bodies, an outer race ring between the casing and the rolling bodies, the sleeve being provided with a chamber for a lubricating material which chamber communicates with the friction surface, packings between the casing and the sleeve, a part of the sleeve projecting visibly through one of said packings, a material which is arranged close to any of the parts of the bearing and which, when the bearing runs hot, changes in form, and means for locking together, upon such changing of said material, the two parts, which are located at opposite sides of the rolling bodies.

27. A combined antifriction and friction bearing comprising a shaft, rolling bodies between two bearing members which latter are arranged the one upon the other on said shaft, locking surfaces on the one of said bearing members, said surfaces normally being located at a small distance opposite locking surfaces on the other of said bearing members, the locking surfaces being rifled.

28. A combined antifriction and friction bearing, comprising a shaft, rolling bodies between two race rings surrounding each other and inserted between a friction bearing sleeve on the shaft and a casing for the whole bearing, said casing consisting partly of a middle part which encloses the antifriction bearing and has a relatively great diameter, and partly of two end parts of reduced diameter, which extends along the ends of the friction bearing sleeve.

29. A combined antifriction and friction bearing, comprising a shaft, rolling bodies between two race rings surrounding each other and inserted between a friction bearing sleeve on the shaft and a casing for the whole bearing, said casing consisting partly of a middle part which encloses the antifriction bearing and has a relatively great diameter, and partly of two end parts of reduced diameter, which extends along the ends of the friction bearing sleeve, two packings at the one of the said end parts of the casing, the one of these packings being arranged between the friction bearing sleeve and the casing, while the other packing is arranged between the bearing and the shaft.

30. A bearing comprising a sleeve on a rotating shaft, said sleeeve being divided axially into separate parts and arranged between two shoulders on the shaft, an inner race ring, means for clamping said race ring on the outside of the sleeve and for holding simultaneously the sleeve parts together, a non-rotating casing, rolling bodies between said race ring and the non-rotating casing, said casing being divided into separate parts and having a part, which is tightened against the sleeve.

31. A bearing comprising a sleeve on a rotating shaft, said sleeve being divided axially into separate parts and arranged between two shoulders on the shaft, an inner race ring, means for clamping said race ring on the outside of the sleeve and for holding simultaneously the sleeve parts together, a non-rotating casing, rolling bodies between said race ring and the non-rotating casing, said casing being divided into separate parts and having a part, which is tightened against the shaft.

In testimony whereof I affix my signature.

YNGVE FLORELL.